(12) United States Patent
Chu et al.

(10) Patent No.: US 6,314,522 B1
(45) Date of Patent: *Nov. 6, 2001

(54) MULTI-VOLTAGE LEVEL CPU MODULE

(75) Inventors: William W. Y. Chu; David H. C. Chen, both of Mountain View, CA (US)

(73) Assignee: Acqis Technology, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,483

(22) Filed: Jan. 13, 1999

(51) Int. Cl.[7] ........................................................ G06F 1/26
(52) U.S. Cl. .......................... 713/322; 710/101; 710/102; 710/104; 710/2; 710/8; 361/686
(58) Field of Search ..................................... 713/322, 300, 713/310, 320, 323, 330, 340, 1; 365/226–229; 710/101, 102, 104, 2, 8, 1; 361/686, 683

(56) References Cited

U.S. PATENT DOCUMENTS

| | | | | |
|---|---|---|---|---|
| 4,890,282 | * | 12/1989 | Lambert et al. | 370/254 |
| 5,331,509 | * | 7/1994 | Kikinis | 361/686 |
| 5,721,837 | * | 2/1998 | Kikinis et al. | 710/101 |
| 5,819,050 | * | 10/1998 | Boehling et al. | 710/104 |
| 5,948,047 | * | 9/1999 | Jenkins et al. | 708/141 |
| 5,999,952 | | 12/1999 | Jenkins et al. | 708/100 |
| 6,029,183 | | 2/2000 | Jenkins et al. | 708/100 |

\* cited by examiner

*Primary Examiner*—Ario Etienne
(74) *Attorney, Agent, or Firm*—Townsend&Townsend&Crew LLP

(57) ABSTRACT

A computer module includes a central processing unit capable of operating at a first performance level and capable of operating at a second performance level in response to configuration signals, and a control logic coupled to the central processing unit for receiving configuration signals and for generating the performance configuration signals, the performance configuration signals comprising a bus clock, a speed multiplier, and an operating voltage, the control logic having a clocked control for receiving the performance configuration signals and in response specifying the speed multiplier, clock configuration signals, and voltage configuration signals, a clock driver coupled to the clocked control logic for receiving the clock configuration signals and in response for outputting the bus clock, and a voltage converter coupled to the clocked control logic for receiving the voltage configuration signals and in response outputting the operating voltage.

22 Claims, 6 Drawing Sheets

MULTI-VOLTAGE LEVEL CPU MODULE

BACKGROUND OF THE INVENTION

The present invention relates to modular computer systems. More particularly, the present invention relates to a modular computer system having context-dependent performance characteristics.

Desktop computers and notebook (portable) computers are similar in relationship to apples and oranges. In today's computing environments, users use dedicated desktop computers for the office and dedicated portable computers for the road. Up to now, there has been little common ground between these platforms in terms of upgradability, ease-of-use, cost, performance, and the like. The differences between these platforms, probably somewhat intentional, has benefited computer manufacturers at the cost of consumers.

A drawback to having two separate computers is that the user wastes significant amount of time transferring software and data between the two computers. For example, the user must couple the portable computer to a local area network (LAN), to a serial port with a modem or null modem, etc. and then manually transfer over files and data between the desktop and the portable computer. Alternatively, the user must use floppy disks to "zip up" or "stuff" files and programs that exceed the storage capacity of conventional floppy disks, and transfer the floppy disk data manually.

Another drawback to the current model of separate notebook and desktop computer is that the user has to spend money to buy components and peripherals the are duplicated in the other computer. For example, both the desktop and portable computers typically include hard disk drives, floppy drives, CD-ROMS, computer memory, host processors, graphics accelerators, and the like. Further, because program software and supporting programs must be installed upon both hard drives in order for the user to use programs on the road and in the office, hard disk space is wasted.

One approach to reduce the above drawbacks has been to have a user purchase and use a notebook (or portable) computer "on the road" and to purchase and use a "docking station" for in-office use. Such docking stations typically include separate monitors, keyboards, mice, and the like. Further, docking stations are different between different portable computer vendors.

Drawback to this approach is that typically the notebook PC typically has lower performance and functionality than a desktop PC. For example, the processor of the notebook is typically much slower than processors in dedicated desktop computers, because of power consumption and heat dissipation concerns. As an example, it is noted that at the time of drafting of the present application, some top-of-the-line desktops include 400 MHz processors, whereas top-of-the-line notebook computers include 266 MHz processors.

Another drawback to the docking station approach is that the typical cost of portable computers with docking stations can approach the cost of having a separate portable computer and a separate desktop computer. Further, as noted above, because different vendors of portable computers have proprietary docking stations, computer users are held captive by their investments and must rely upon the particular computer vendor for future upgrades, support, and the like.

Modular computer architectures have been proposed in the past. Such architectures however focus upon the interchangeability and upgradability of parts. For example, a new "standard" known as "Device Bay" has been proposed by Compaq Computer Corporation, Intel Corporation, Microsoft and other personal computer manufacturers. The Device Bay is currently focused upon computer peripheral devices such as CD-ROMS, DVD drives, hard disk drives, and the like for desktop computers.

A drawback with the Device Bay standard is that the Device Bay is not focused upon other components the user may wish upgrade, such as the CPU, the memory, graphics accelerators, and the like. Further, the Device Bay is oriented towards making user upgrades to a desktop computer easier, and not focused upon the interchangeability of computing subsystems with portable computers.

Yet another drawback with previous modular computer architectures proposed in the past is that the performance of the computers (for example the CPU) vary little if at all based upon configuration and reconfiguration of the computer system.

Thus what is needed are computer systems that provide reduced user investment in redundant computer components and provide a variable level of performance based upon computer configuration.

SUMMARY OF THE INVENTION

The present invention relates to a modular computer system. In particular, the present invention relates to a modular computer system having computer modules whose performance adapts to particular computer environments.

According to an embodiment of the present invention, a computer module includes a central processing unit capable of operating at a first performance level and capable of operating at a second performance level in response to configuration signals, and a control logic coupled to the central processing unit for receiving configuration data and for generating the configuration signals, the configuration signals comprising control signals for a bus clock, a speed multiplier, and an operating voltage. The control logic includes a clocked control logic for receiving the configuration data and in response specifying the speed multiplier, clock configuration data, and voltage configuration data, and a clock driver coupled to the clocked control logic for receiving the clock configuration data and in response for outputting the bus clock. A voltage converter coupled to the clocked control logic for receiving the voltage configuration data and in response outputting the operating voltage is also included.

According to another embodiment, a computer console is coupled to a removable computer module for specifying a speed of operation for the removable computer module, the removable computer module including a processor having multiple speeds of operation. The computer console includes a computer module bay electrically and physically coupled to the removable computer module. The computer module bay includes a power bus for providing power to the removable computer module, and a video bus for receiving video output data from the removable computer module. The computer module bay also includes a heat sink for drawing thermal heat from the removable computer module; and a configuration data source for providing configuration data to the removable computer module.

According to another embodiment of the present invention, a method for configuring performance of a removable computer module having a processor includes inserting the removable computer module into a computer console, supplying power from the computer console to the removable computer module, and supplying configuration data from the computer console to the removable computer module. Determining configuration signals in response to the configuration data, and applying the configuration signals to a processor are also accomplished.

Further understanding of the nature and advantages of the invention may be realized by reference to the remaining portions of the specification and drawings.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF THE SPECIFIC EMBODIMENTS

Overview

Figure 1:
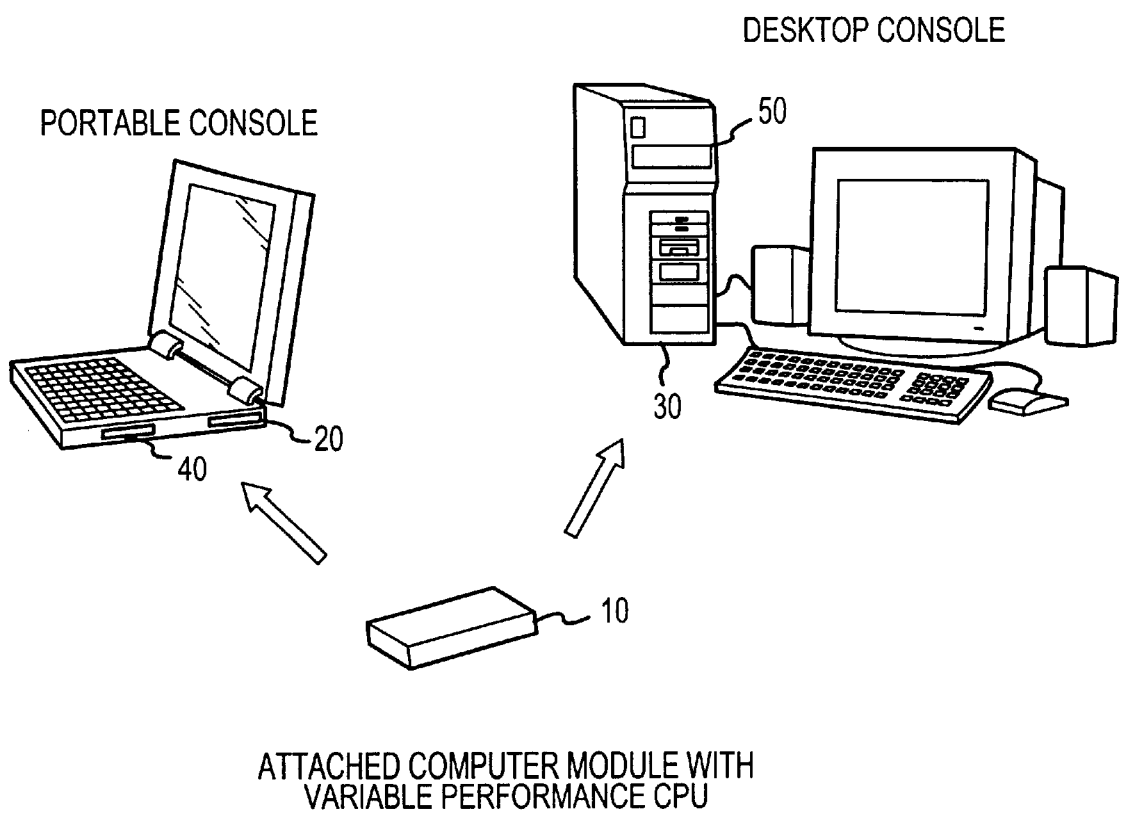
FIG. 1 illustrates an embodiment of the present invention.

FIG. 1 illustrates an embodiment of the present invention. FIG. 1 includes an attached computer module (ACM) 10, a portable console 20, and a desktop console 30. Portable console 20 includes a computer module bay 40 and desktop console 30 includes a computer module bay 50.

In the present embodiment ACM 10 includes typical computer components, as will be described below, including a CPU, IDE controller, hard disk drive, computer memory, and the like. The Computer Module Bays (CMBs) 40 and 50 are openings in peripheral consoles, for example portable console 20 and desktop console 30. The CMBs provide mechanical protection to ACM 10, mechanical alignment mechanism for the mating between the parts, thermal heat dissipation sinks, electrical connection mechanisms, and the like.

Portable console 20 and desktop console 30 typically include computer components including a power supply (or battery), audio processing and output devices, modems, displays, and the like. Further information regarding ACM 10, portable console (PCON) 20, and desktop console (DCON) 30, are disclosed in co-pending application Ser. No. 09/149,882 filed Sep. 8, 1998 entitled Communication Channel And Interface Device For Bridging Computer Interface Buses, and co-pending application Ser. No. 09/149,548 filed Sep. 8, 1998, entitled Personal Computer Peripheral Console With Attached Computer Module. These applications are incorporated by reference for all purposes.

In the present embodiment ACM 10 is typically inserted into computer bay 40 when the user wishes to use portable console 20 "on the road." When ACM 10 is inserted into computer bay 40, the combination of ACM 10 and portable console 20 substantially provides the user with the functionality of typical notebook or portable computers. Such a combination may be used in any environment portable computers are normally used in, for example, while traveling, at home, in the office, etc.

In the present embodiment ACM 10 is typically inserted into computer bay 50 when the user wishes to use the desktop console 20. When ACM 10 is inserted into computer bay 50, the combination of ACM 10 and desktop console 30 substantially provides the user with the functionality of typical desktop computers. For example, enabling LAN access, providing full-sized keyboard input, enabling a high resolution display, a larger screen, and the like.

In one embodiment of the present invention an ACM for portable console 10 is the same size as an ACM for desktop console 20. In alternative embodiments of the present invention, a portable ACM may be of a different size than a desktop ACM. In one embodiment, the portable ACM may be smaller than the desktop ACM, and the portable ACM may be used with portable console 10, or with a simple adapter with desktop console 20. In such an embodiment, a desktop ACM would be physically too big to be inserted into a computer module bay of a portable ACM.

Block Diagram

Figure 2:
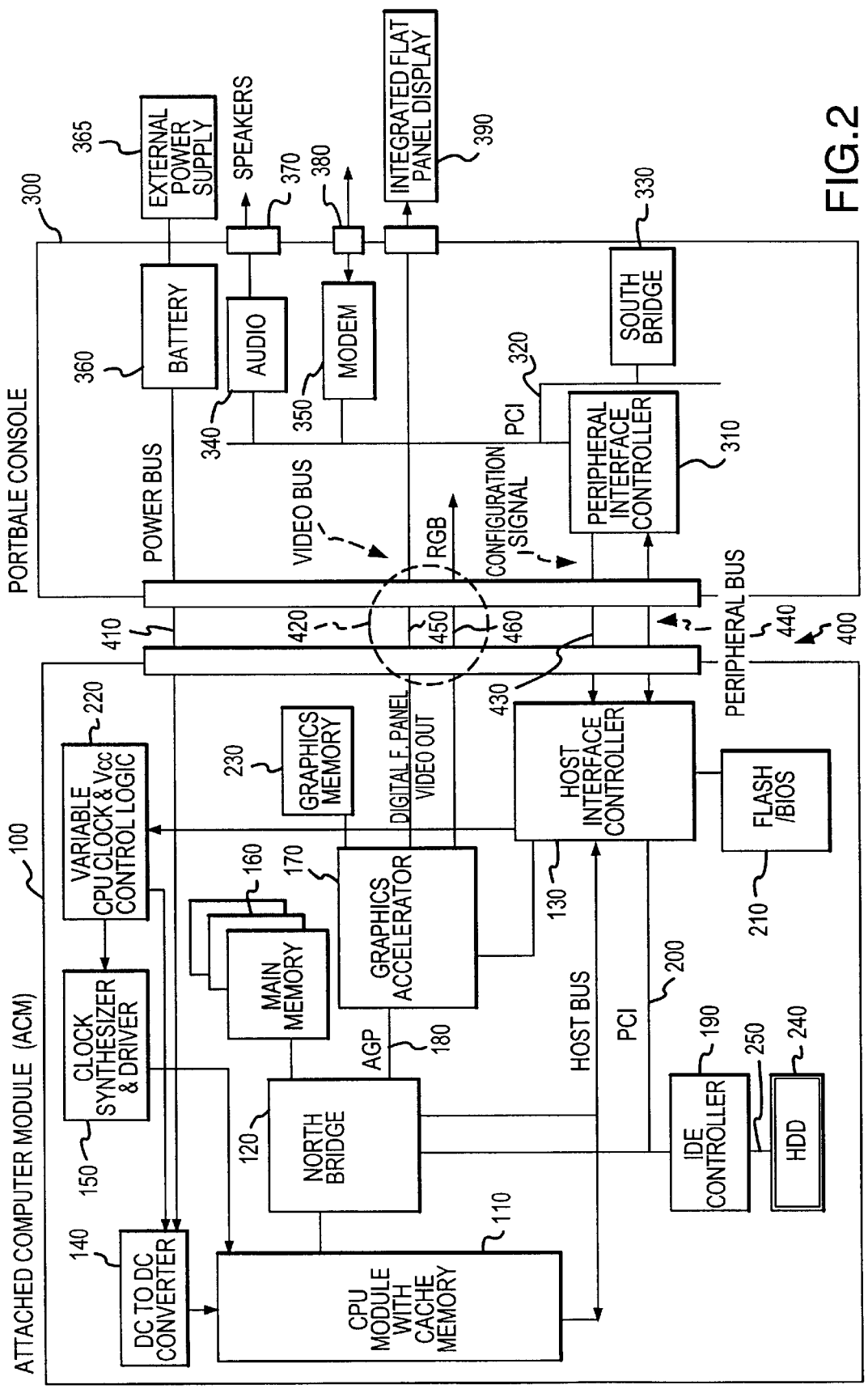
FIG. 2 is a simplified block diagram of an embodiment of the present invention.

FIG. 2 is a simplified block diagram of an embodiment of the present invention. FIG. 2 illustrates a block diagram of an attached computer module (ACM) 100, a portable console 300, and an interface 400.

Interface 400 typically includes a number of interfaces including a power bus 410, a video bus 420, a configuration interface 430 and a peripheral bus 440. Video bus typically includes a panel driver interface 450 and an RGB interface 460.

ACM 100 includes a central processing module with an attached cache memory (CPU) 110, coupled to a north bridge unit 120, to a host interface controller 130, to a DC converter 140, and a clock synthesizer and driver (clock driver) 150.

North bridge unit 120 is coupled to computer memory 160, to a graphics accelerator 170 via an advanced graphics port (AGP) 180, to an IDE controller 190, and to host interface controller 130 via a peripheral component interconnect (PCI) bus 200.

Host Interface controller 130 is also coupled to a BIOS/flash memory 210, to a clocked control logic 220, to console configuration data 430, and to peripheral bus 440. Input into DC converter 140 comes from clocked control logic 220 and power bus 410. Clocked control logic 220 includes an adjustable phase lock loop (PLL) circuit and receives a reference clock signal from a crystal oscillator 470.

Graphics accelerator 170 is typically coupled to a graphics memory 230, to panel driver interface 450, and to RGB interface 460. IDE controller 190 is coupled to a mass storage device 240 via an IDE bus 250.

Portable console 300 typically includes a Peripheral interface controller 310 coupled to configuration interface 430, to peripheral bus 440, and to a PCI bus 320. PCI bus 320 is in turn coupled to a south bridge unit 330, to an audio driver 340, and to a modem 350. Audio driver 340 is typically coupled to audio output devices (such as speakers) 370, and Modem (or other network interface device) 350 is typically removably coupled to a network interface port 380.

Portable console 300 typically also includes a flat panel display 390, coupled to panel driver interface 450. A battery 360 is typically coupled to power bus 410 and removably coupled to an external power supply 365.

As described in the referenced disclosures, CPU 110 resides in ACM 100 which is removably coupled from portable console 300, as well as a desktop console, for example DCON 30 in FIG. 1. In one embodiment of the present embodiment, CPU 110 is a 400 MHz or greater Pentium II microprocessor module from Intel Corporation. In other embodiments, other types of microprocessors can be used, such as the Advanced Micro Devices K6-2 chip, Compaq Computer Corporation Alpha Chip, Apple Computer Corporation PowerPC G3 processor, and the like. Further, higher speed processors are contemplated in other embodiments as technology increases in the future.

North bridge 120 typically provides access from CPU 110 to main memory 160, supports and provides timing signals necessary for AGP 180 and PCI bus 200, and provides access from and to host interface controller 130. In the present embodiment, north bridge unit 120 is embodied as a 440 BX chip from Intel. Future enhancements by Intel and other manufactures are envisioned in other embodiments of the present invention.

South bridge 120 typically provides access from peripheral interface controller 310, and supports and provides timing signals necessary for PCI bus 320. In the present embodiment, south bridge unit 120 is embodied as a P11X4E chip from Intel. Future enhancements by Intel and other manufactures are envisioned in other embodiments of the present invention.

The amount of memory 160 within ACM 100 is variable, and typically includes a minimum of 16 to 32 Megabytes of dynamic memory. The amount of memory is typically upgradable. Embodiments of memory 160 may include EDO DRAM, SDRAM, Static RAM, Flash memory, and any current or future memory technology devices.

IDE controller 190 supports and provides timing signals necessary for IDE bus 250. In the present embodiment, IDE controller 190 is embodied as a 643U2 PCI to IDE chip from CMD Technology. Other types of buses than IDE are contemplated, for example EIDE, SCSI, USB, and the like in alternative embodiments of the present invention.

Mass storage unite 240 typically includes a computer operating system, application software program files, data files, and the like. In one embodiment, the computer operating system may be the Windows98 operating system from Microsoft Corporation. Other operating systems, such as WindowsNT, MacOS8, Unix, and the like are also contemplated in alternative embodiments of the present invention. Further, typical application software programs may include Office98 by Microsoft, Corel Perfect Suite by Corel, and others.

Storage unit 240 is typically a hard disk drive (HDD), however, alternative embodiments may include removable hard disk drives, read/write CD ROMs, flash memory, floppy disk drives, and the like. A small form factor, for example 2.5" is currently contemplated, however, other form factors, such as 3.5" drive, PC card, and the like are also contemplated. Mass storage unit 240 may also support other interfaces than IDE, as described above.

In the present embodiment, graphics accelerator 170 provides panel driver signals to panel driver interface 450, that are in turn provided to panel display 390. Graphics accelerator typically also provides RGB driver signals to RGB interface 460. RGB driver signals are typically used to drive an RGB monitor coupled to a desktop console, as illustrated in FIG. 1. In alternative embodiments, panel driver signals are also used to drive a panel display coupled to a desktop console.

In one embodiment graphics accelerator 170 is embodied as an ATI Rage Pro LT AGP chip set, in another embodiment, graphics accelerator 170 is embodied as an integrated graphics accelerator and memory chip, such as the Neomagic Magic Graph 128×D PCI on the PCI bus. Other embodiments of the present invention may include any present or future chip set that supports PCI bus 200 or AGP 180. Graphics memory 230 is typically embodied in the same manner as memory 160, however may be different. Current embodiments contemplate memory 160 having a memory size of 2 to 8 Megabytes, however may be different and greater.

Host interface controller 130 provides an interface between north bridge 120/PCI bus 200 and south bridge 330/PCI interface 320. In the present embodiment, host interface controller 130 is under development by Acqis Technology, Inc. In the future, other types of interface controllers providing a interface between a different chip set 120 and PCI bus 200 and peripheral devices, such as National Semiconductor's SuperIO and PCI Interface 320 are contemplated.

A BIOS 210 stored in a flash memory is typically coupled to host interface controller 130 to provide ACM system BIOS and configuration data. In one embodiment, two types of ACM performance configurations are stored, a desktop console configuration, and a portable console configuration. In alternative embodiments, more than two ACM configurations may be stored and used by the ACM, for example, a power-saving portable console configuration, a dynamic console configuration, a power-saving desktop console configuration and the like. The graphics controller driver typically uses the performance configuration data during power-up to set up proper video output signals. These configurations will be described in greater detail below.

Peripheral interface controller 310 also provides an interface between north bridge 120/PCI bus 200 and south bridge 330/PCI interface 320. In the present embodiment, peripheral interface controller 310 is also under development by Acqis Technology, Inc. In the future, other types of interface controllers providing an interface between north bridge 120 and PCI bus 200 and south bridge 330 and PCI interface 320 are also contemplated.

Audio driver 340 typically converts signals provided on PCI bus 320 to analog form for audio output on speakers 370, or other output device. Audio driver may be any conventional audio chip such as Solo™ PCI Audio Drive® from ESS Technology, Inc.

Modem 350 provides interface signals to an external network via network interface 380, for example, a telephone line. Other types of network interfaces are contemplated, for example an Ethernet interface, and the like.

The present embodiment uses peripheral bus 400 to provide control signals between host interface controller 130 and peripheral interface controller 310. In one embodiment of the present invention, peripheral bus 440 is the exchange interface system (XIS) bus disclosed in the referenced patent applications.

DC converter 140 typically converts voltage provided by power bus 410 to a CPU operating voltage. As will be described below, the voltage on power bus 410 and the CPU operating voltage are typically different when ACM 100 is used with a portable console 20 and with a desktop console 30, as illustrated in FIG. 1. In one embodiment of the present invention DC converter 140 is embodied as a LM 2630 component from National Semiconductor, although in other embodiments, other components can also be used.

In one embodiment, the console configuration data is passed from host interface controller 130 directly to clocked control logic 220. In an alternative embodiment console configuration data on configuration interface 430, is passed from host interface controller to BIOS 210 and additional console configuration data is passed to clocked control logic 220. In either case, in response, clocked control logic 220 outputs performance configuration signals (control signals) to clock driver 150 and to DC converter 140, as will be described further below. In the present embodiment clocked control logic 220 is a clock chip compatible to Intel Corporation's CK100 specification. In the present embodiment, clock driver 150 typically includes a clock synthesizer and a clock driver.

In the present embodiment, clocked control logic 220 is an embodiment of a configuration control logic that provides ACM 100 with appropriate performance configuration signals. In alternative embodiments of the present invention, the configuration control logic need not be clocked and may provide other performance configuration signals other than a reference clock, for example those discussed below, and the like.

In the present invention, other typical components that may be disposed within portable console 300 may include PC (PCMCIA) card slots, storage media and removable storage media including floppy disk drives, hard disks, CD-ROM or DVD drives, keyboards, user input devices such as trackpads, trackballs, pointers, microphones, "Device Bays", Computer Module Bays 40 (FIG. 1), and the like. This list is not exhaustive, and many other types of components may also be incorporated within portable console 300.

Figure 3:
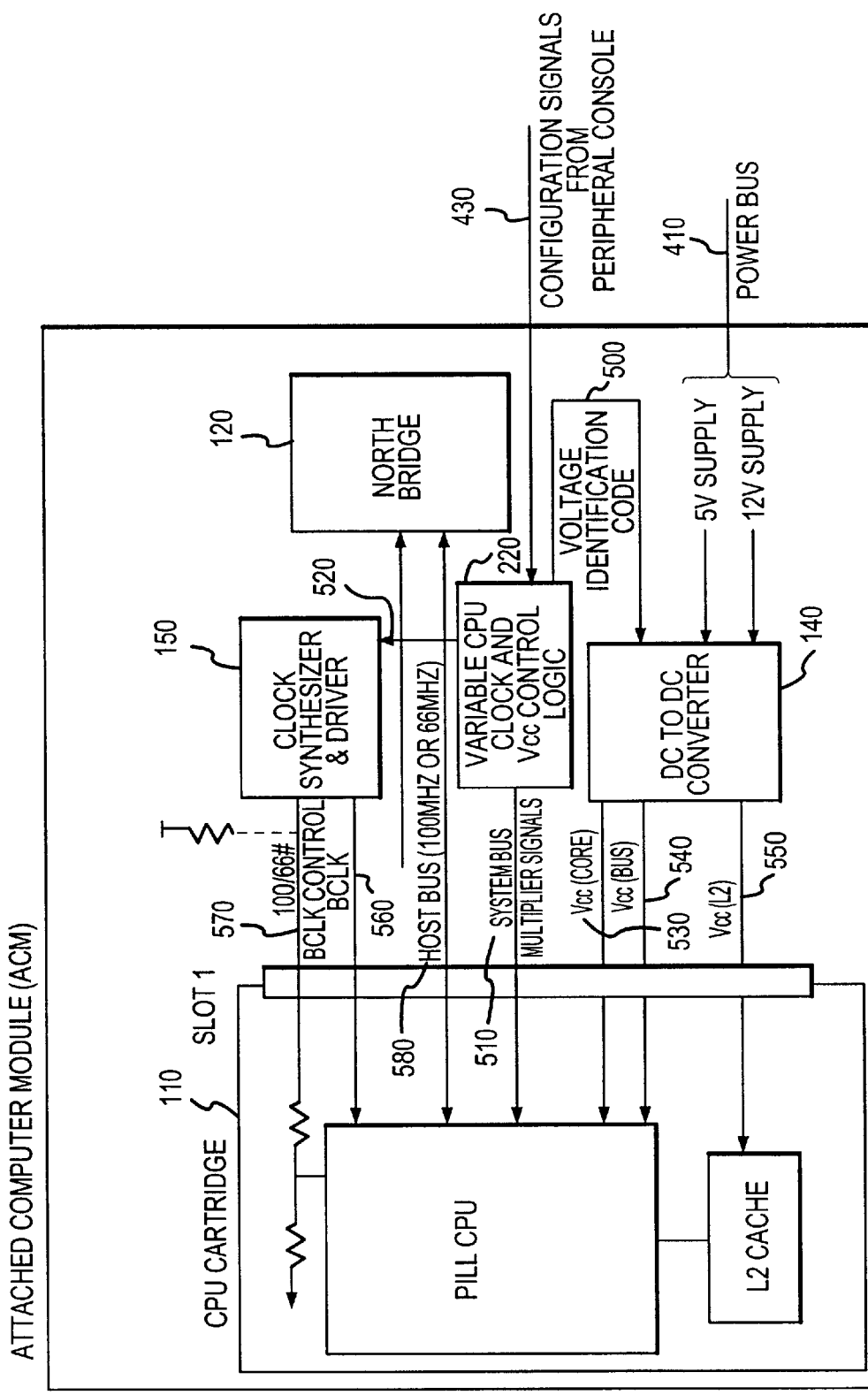
FIG. 3 illustrates a detailed block diagram of a portion of the embodiment described in FIG. 2.

FIG. 3 illustrates a detailed block diagram of a portion of the embodiment described in FIG. 2. For sake of convenience, the reference numerals in FIG. 2 are the same as in FIG. 3.

As illustrated in FIG. 3, clocked control logic 220 is coupled by a signal line 500 to DC converter 140 to provide a voltage identification (VI) code. Clocked control logic 220 is also coupled to CPU 110 by a signal line 510 to provide a system bus multiplier signal (bus multiplier). Clocked control logic 220 is also coupled to clock driver 150 by a signal line 520 to provide a reference clock signal.

Crystal 470 is coupled to clocked control logic 220 to provide a reference frequency. In response to the console configuration data from signal line 430, a variable phase lock loop (PLL) circuit within clocked control logic 220 is adjusted to output different frequencies for the reference clock signal to clock driver 150. As described further below, in response to the different frequencies for the reference clock signal, clock driver 150 outputs different bus clock (BCLK) frequencies.

DC converter 140 is coupled to CPU 110 to provide a core operating voltage (VCC core) 530, a bus operating voltage (VCC bus) 540, and typically a cache operating voltage (VCC L2) 550. In the present embodiment, DC converter 140 is coupled to a 5 volt and a 12 volt power supply, typically from power bus 410. Clock driver 150 is coupled to CPU 110 to provide a system bus frequency clock (BCLK) 560 and a system bus frequency clocked control signal (BCLK control) 570.

As illustrated in FIG. 3, a host bus 580, operating between CPU 110 and north bridge 120 operates at a host bus frequency.

In FIG. 3, console configuration data from configuration interface 430 are passed from host interface controller 130 to clocked control logic 220. The console configuration data are configured in this embodiment as a logical high or low signal during a specified time period after power-up. For example, a configuration signal can be "high" to indicate use of the module in a low power dissipation portable environment and the configuration signal can be "low" to indicate use of the module in a high dissipation desktop environment.

In response to the console configuration data 430, clocked control logic 220 outputs performance configuration signals, such as a bus multiplier signal on signal line 510. Further, in response to the configuration data, clocked control logic 220 outputs a VI code on signal line 500 to DC converter 140. In turn, DC converter outputs a Vcc core 530 depending upon VI code 500, as will be described below. In a preferred embodiment, VCC bus 540, and VCC L2 are also dependent upon VI code 500.

Clocked control logic 220 also outputs a reference clock input signal on signal line 520 to clock driver 150, in response to the console configuration data. In response, in the present embodiment, clock driver 150 outputs BCLK 560 and notifies CPU 110 of the specific frequency by BCLK control 570. BCLK 560 is also preferably output to north bridge 120. Clock driver 150 typically generates other clock output signals that are used in the present embodiment. For example, other clocks can include clocks for the universal serial bus (USB) and the like.

Method of Operation

The present embodiment includes a CPU module (CPU 110) that can operate at two different voltage levels and two different operating frequencies. For example, in the present embodiment, CPU 110 is a Pentium II CPU module, however in alternative embodiments it should be understood that other processors can be also used.

In the current art of process technology, it is well known that a MOS transistor can operating at a faster speed if the voltage supply level is increased. Within its operating range of voltage level, a MOS logic device will support high operating frequency with higher supply voltage level.

In the present embodiment, when ACM 100 is coupled to portable console 20, it is envisioned that CPU 110 operate at a 266 MHz CPU clock speed and a 66 MHz host bus speed 580. Further, when ACM 100 is coupled to desktop console 30, it is envisioned that CPU 110 operate at a 400 MHz CPU clock speed and a 100 MHz host bus speed 580. It should be understood that in future embodiments of the present invention, other frequencies are contemplated.

In the present embodiment, where CPU 110 is a Pentium II module, in order to provide such functionality, within portable console 20, CPU 110 is provided with a core processing voltage (VCC core 530) of 1.8 volts, and a system bus frequency (BCLK 560) of 66 MHz. Further, within desktop console 30, CPU 110 is provided with a core processing voltage (VCC core 530) of 2.0 volts, and a system bus frequency (BCLK 560) of 100 MHz. Further, in the present embodiment, CPU 110 clock frequency depends on a multiplication factor (M) based on the configuration status of four signals: A20M#—address bit 20 mask; LINT1—Local Interrupt input 1; LINT2—Local Interrupt input 2; IGNNE#—Ignore error for co-processor.

| Multiplication of processor core frequency to system bus frequency | LINT[1] | LINT[2] | A20M# | IGNNE# |
|---|---|---|---|---|
| 1/2 | L | L | L | L |
| 1/4 | L | L | H | L |
| 2/7 | L | H | L | H |
| 1/2 | H | H | H | H |

In one embodiment, for a Pentium II CPU module, the system bus frequency (BCLK) is typically either 66 MHz or 100 MHz. The bus frequency is selected by BCLK control 570. The following example illustrates one embodiment of the variable performance Pentium II CPU module:

|  | PII in Portable Console | PII in Desktop Console |
|---|---|---|
| Host bus clock: BCLK | 66 Mhz | 100 Mhz |
| Multiplication factor: M | ¼ | ¼ |

-continued

|  | PII in Portable Console | PII in Desktop Console |
|---|---|---|
| CPU clock: BCLK/M | 266 Mhz | 400 Mhz |
| Processor core voltage | 1.8v | 2.0v |

Figure 4A:
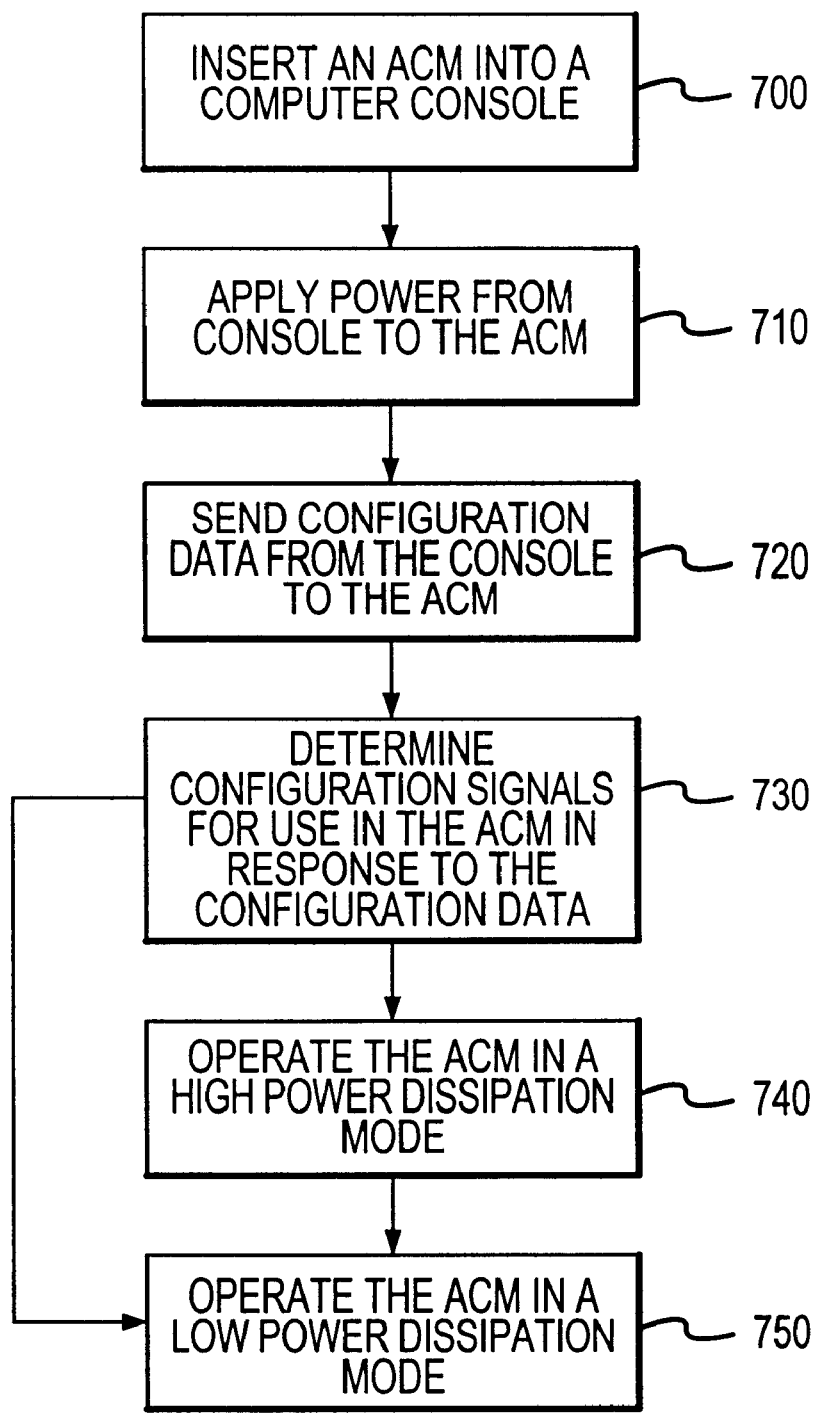
FIGS. 4a and b illustrate flowcharts of embodiments of the present invention.
Figure 4B:
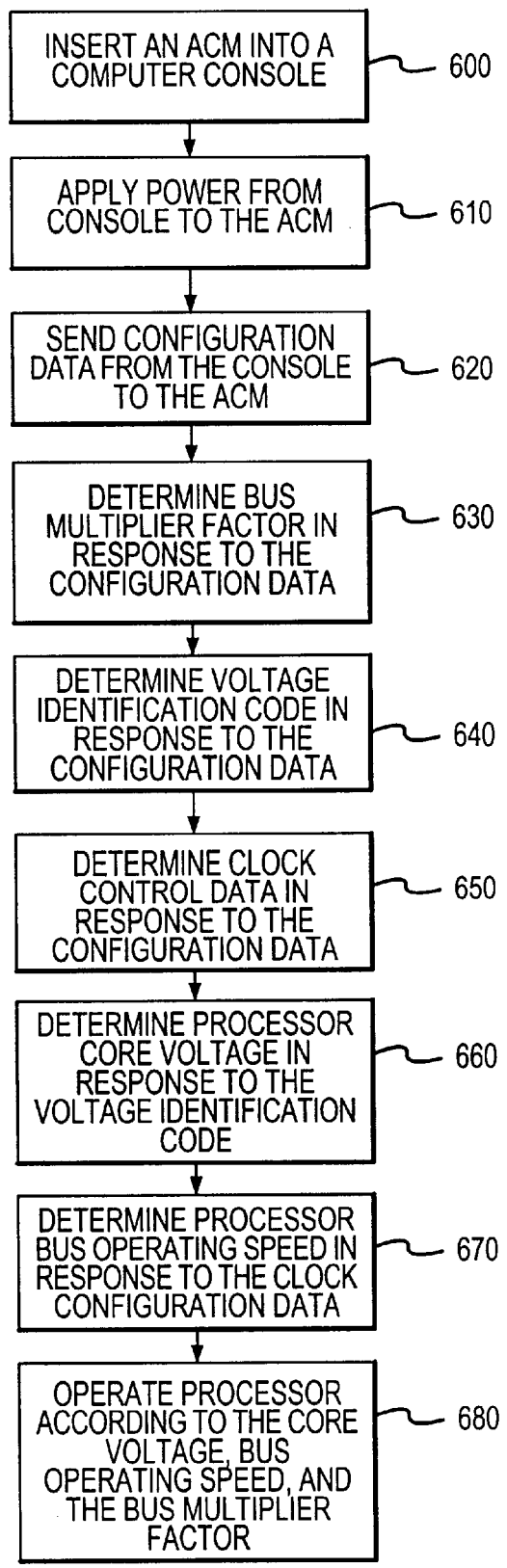

FIGS. 4a and b illustrate flowcharts of embodiments of the present invention. FIGS. 4a and 4b use the reference numerals of the above figures for sake of convenience. Further, the flowcharts assume implementation of ACM 100 with a variable performance CPU and support logic providing the capabilities described above.

In FIG. 4a, ACM 100 is initially inserted into a computer module bay according to embodiments of the present invention, step 700. Next, power is provided to ACM 100, step 710. Console configuration data from the console are then sent on configuration interface 430 to clocked control logic 220, step 720.

In one embodiment, the console configuration data need not utilize a dedicated pin (or pins) on interface 400, and can utilize a pin (or pins) not used at boot-up time. In such an embodiment, the console configuration data can appear on such a pin for only a predetermined about of time during boot-up. After the boot-up process, the pin may be used for another purpose, such as transfer of data, and the like.

In an alternative embodiment, a dedicated pin may be provided on interface 400. In such an embodiment, the performance level of the ACM 100 may be changed at times other than boot-up. To vary performance of the ACM, the output parameters of clocked control logic 220, for example, VI, multiplication factor, and the like could be changed dynamically in response to instructions from the user.

In the present embodiment, in response to the console configuration data, ACM 100 is directed to operate in either a high power consumption mode or a lower power consumption mode, step 730. In the present embodiment, the high power consumption mode implies higher CPU 110 performance, for example when operating in a desktop console 30 or other console having good heat dissipation capability and few concerns regarding available power, step 740. Conversely, the lower power consumption mode implies lower CPU 10 performance, for example when operating in a portable console 20, or other console with limited power or heat dissipation capability, step 750.

In FIG. 4b, initially, ACM 100 is inserted into a computer module bay, step 600. Next, power is provided to ACM 100, step 610. Console configuration data from the console are then sent to clocked control logic 220, step 620.

In response to the console configuration data, clocked control logic 220 determines the appropriate bus multiplier to output onto signal line 510 to CPU 110, step 630. Clocked control logic also determines the appropriate VI code to output onto signal line 500 to DC converter 140, step 640. Further, clocked control logic determines the appropriate reference clock signal (generally, clocked control data signals) to output onto signal line 520 to clock driver 150 by adjusting the PLL circuit, step 650.

In response to the VI code, DC converter outputs an appropriate VCC core voltage 530 to processor 110, step 660. In response to the clocked control data, clock driver 150 outputs an appropriate BCLK 560 signal and an appropriate BCLK control signal 570 to CPU 110, step 670.

CPU 110 receives BCLK control signal 570, BCLK signal 560, the bus multiplier, and VCC core 530, and in response, operates at the configured host bus speed and CPU clock speed, step 680.

Power Considerations

As described above, when CPU 110 operates at different voltages and at different operating frequencies, the amount of power consumed by CPU 110 is variable. In the present embodiment, as the performance of CPU 110 increases, the power consumption also increases. Because of CPU 110 and other components disposed in ACM 100 consume more power in a desktop console environment, the desktop console must be able to effectively dissipate heat away from ACM 100.

Figure 5:
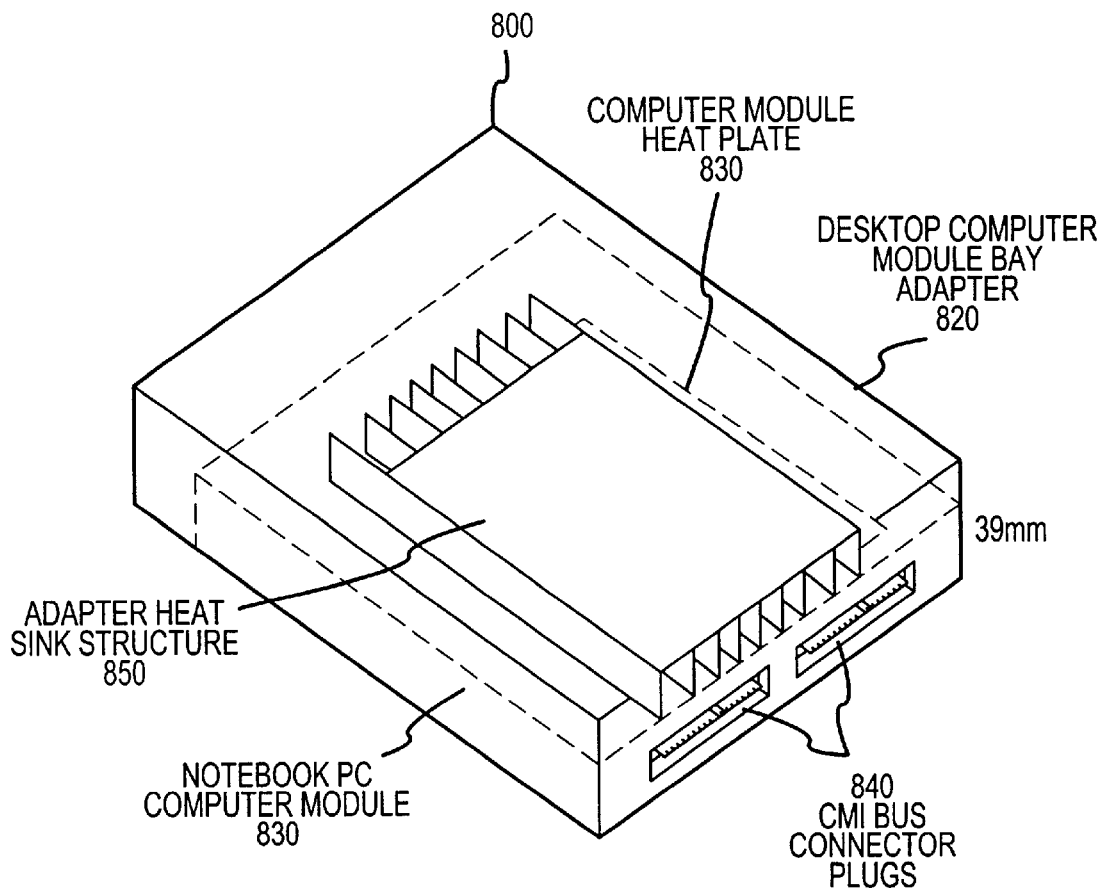
FIG. 5 illustrates an embodiment of a heat sink according to an embodiment of the present invention.

FIG. 5 illustrates an embodiment of a heat sink according to an embodiment of the present invention. FIG. 5 illustrates a device bay 800 within a desktop console, a portable ACM 810 disposed within device bay 810, and an adapter 820.

In the embodiment of FIG. 5, portable ACM 810 includes a heat plate 830 for conducting heat from the internal components to the surface of portable ACM 810, and connectors 840 providing interface 400, described above.

Adapter 820 includes a heat sink 850 that is thermally coupled to heat plate 830. Heat sink 850 is embodied to help transfer heat away from portable ACM 810. In one embodiment of the present invention, adapter 820 may include a fan that blows or sucks cooler air across heat sink 850 to actively aid in thermal heat transfer. In other embodiments, the desktop console may include a mechanism that draws air over heat sink 850. Other configurations for heat sink 850 than that shown in FIG. 5 are contemplated in other embodiments of the present invention.

In the embodiment where ACMs are all of the same size, desktop consoles may include similar heat dissipation sinks, fans, etc. as adapter 820 described above.

Conclusion

In the foregoing specification, the invention has been described with reference to specific exemplary embodiments thereof Many changes or modifications are readily envisioned. For example, it is envisioned that more than two performance levels are obtainable from a CPU within the ACM. Further, different performance levels may be based upon more factors than described above, for example, depending upon the thermal and power characteristics of the console, user preference, and the like. In such embodiments, other parameters that those described above may also be changed, for example, the multiplication factor M can be varied, and the like. Further, other operating speeds than that described above are contemplated as the state of microprocessors advance.

The described disparity in desktop performance and portable performance may lessen in the future with advances in heat dissipation technologies, processor technologies, and the like. However, it may still be desirable in such a case to have adjustable levels of performance for an ACM, especially with portable computers. For example, a lower performance ACM may extend battery life.

The number and types of components within the ACM will vary depending upon the specific configuration data required by different CPU manufactures. Further, the type of configuration data sent by consoles will vary according to specific implementations of embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for configuring performance of a computer module removable from a peripheral console, the method comprising:

attaching the computer module to the peripheral console;

supplying power from the peripheral console to the computer module, such that the computer module receives power only when attached to the peripheral console;

supplying configuration data from the peripheral console to the computer module;

determining performance configuration signals in the computer module in response to the configuration data; and applying the performance configuration signals to control a performance level of a central processing unit of the computer module.

2. The method of claim 1 wherein determining performance configuring signals comprises determining speed multiplier signals of the central processing unit.

3. The method of claim 1 wherein determining performance configuring signals comprises determining a bus clock signal for the central processing unit.

4. The method of claim 1 wherein determining performance configuration signals comprises determining an operating voltage for the central processing unit.

5. The method of claim 1 wherein determining performance configuring signals comprises determining a host bus speed.

6. The method of claim 4 wherein determining performance configuring signals comprises determining a voltage identification code.

7. A modular computer system comprising:
a peripheral console including,
a power supply, and
a first controller configured to emit configuration data; and
a computer module receiving power only when attached to the peripheral console, the computer module including,
a configuration control logic configured to receive the configuration data and in response transmit a performance configuration signal, and
a central processing unit configured to receive power only from the power supply and to operate at one of a first performance level and a second performance level in response to the performance configuration signal.

8. A modular computer system according to claim 7 wherein the computer module further comprises a clock driver in communication with the central processing unit, the performance configuration signal comprising a clock signal controlling a speed of operation of the central processing unit.

9. A modular computer system according to claim 8 wherein the computer module further comprises a BIOS, the BIOS configured to receive the configuration data from the peripheral console and to generate additional console configuration data to the configuration control logic.

10. A modular computer system according to claim 7 wherein the computer module further comprises a voltage converter in communication with the power bus and with the central processing unit, the performance configuration signal comprising a voltage identification signal controlling a voltage of operation of the central processing unit.

11. A modular computer system according to claim 7 wherein the computer module further comprises a data bus in communication with the peripheral console and a bus controller in communication with the data bus, the performance configuration signal comprising a bus multiplier signal controlling a speed of operation of the data bus.

12. A modular computer system according to claim 7 wherein the peripheral console further comprises a video bus and the computer module further comprises a graphics controller, the performance configuration signal controlling a format of video output from the graphics controller to the peripheral console across the video bus.

13. A modular computer system according to claim 12 wherein the graphics controller is configured to output a video output signal having one of an analog television signal format, an analog RGB signal format, and a digital video signal format.

14. A modular computer system comprising:
a peripheral console including,
a power supply,
a peripheral interface controller configured to emit configuration data indicative of a type of the peripheral console, and
a display device; and
a computer module removable from the peripheral console wherein the computer module receives power only when attached to the peripheral console, the computer module including,
a central processing unit configured to operate at one of a first performance level and a second performance level in response to the performance configuration signal, and
a graphics controller configured to drive only the display device in response to the configuration data.

15. The modular computer system of claim 14 further comprising a bus configured to carry video signals transmitted from the graphics controller to the display device.

16. The modular computer system of claim 15 wherein:
the video signals comprise analog RGB signals, vertical synchronization signals, and horizontal synchronization signals; and
the display device comprises a color monitor displaying an image only when the computer module is attached to the peripheral console.

17. The modular computer system of claim 15 wherein:
the video signals comprise digital RGB signals, vertical synchronization signals, and horizontal synchronization signals; and
the display device comprises a color flat panel display displaying an image only when the computer module is attached to the peripheral console.

18. The modular computer system of claim 14 wherein:
the computer module further comprises a variable clock frequency driver coupled to the central processing unit, the variable clock frequency driver configured to operate the central processing unit at one of a first clock speed and a second clock speed in response to the configuration signal.

19. The modular computer system of claim 14 wherein:
the computer module further comprises a variable DC to DC voltage converter coupled to the central processing unit, the variable voltage converter configured to operate the central processing unit at one of a first operating voltage and a second operating voltage in response to the configuration signal.

20. A modular computer system comprising:
a peripheral console including,
a power supply,
a peripheral interface controller configured to emit configuration data indicative of a type of the peripheral console,
a user input device; and a computer module removable from the peripheral console wherein the computer module receives power only when attached to the peripheral console, the computer module including, a central processing unit configured to operate at one of a first performance level and a second performance level in response to the performance configuration signal, and an input device controller configured to receive input signals from the user input device in response to the configuration data.

21. The modular computer system of claim 20 wherein:

the computer module further comprises a variable clock frequency driver coupled to the central processing unit, the variable clock frequency driver configured to operate the central processing unit at one of a first clock speed and a second clock speed in response to the configuration signal.

22. The modular computer system of claim 20 wherein:

the computer module further comprises a variable DC to DC voltage converter coupled to the central processing unit, the variable voltage converter configured to operate the central processing unit at one of a first operating voltage and a second operating voltage in response to the configuration signal.

* * * * *